UNITED STATES PATENT OFFICE.

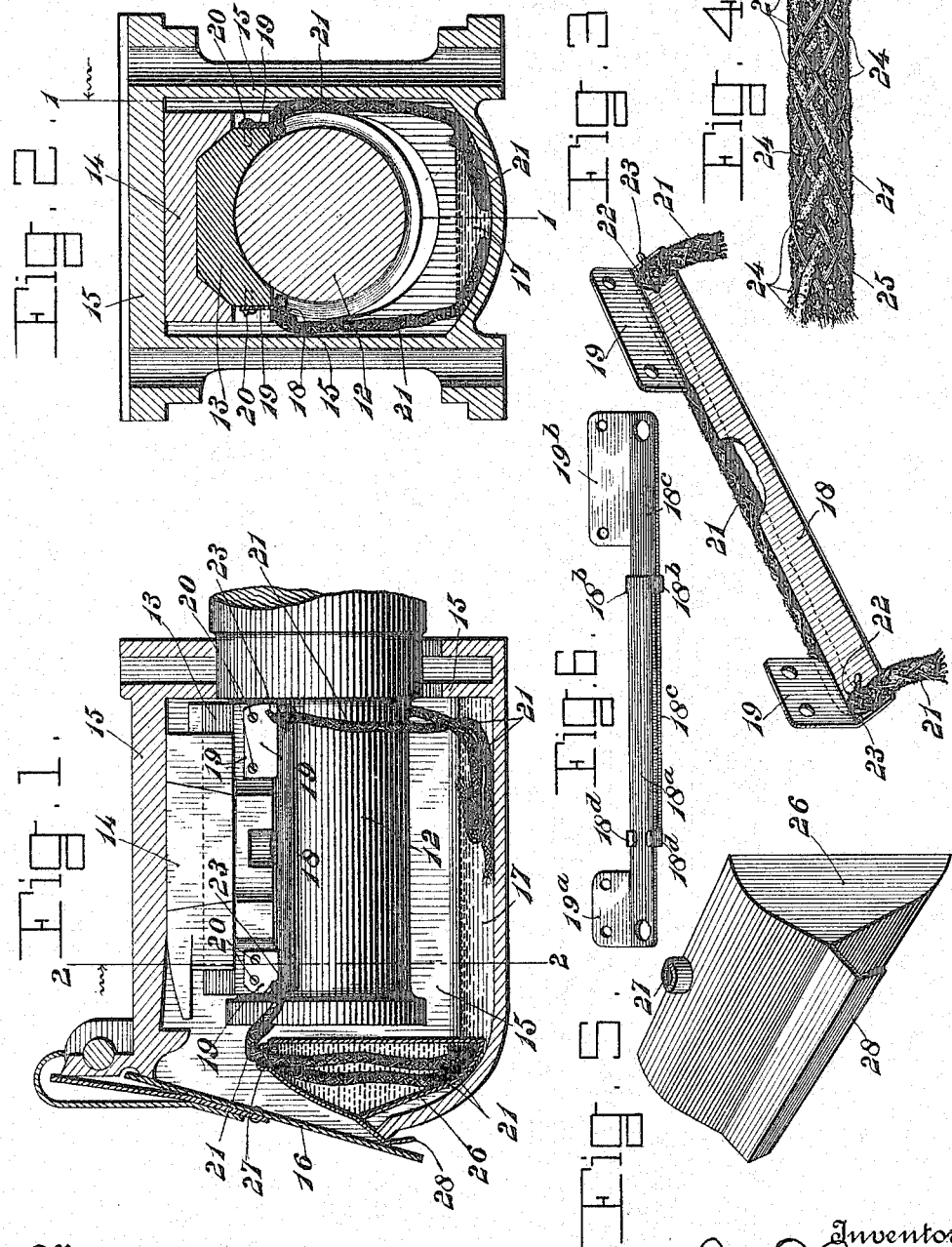

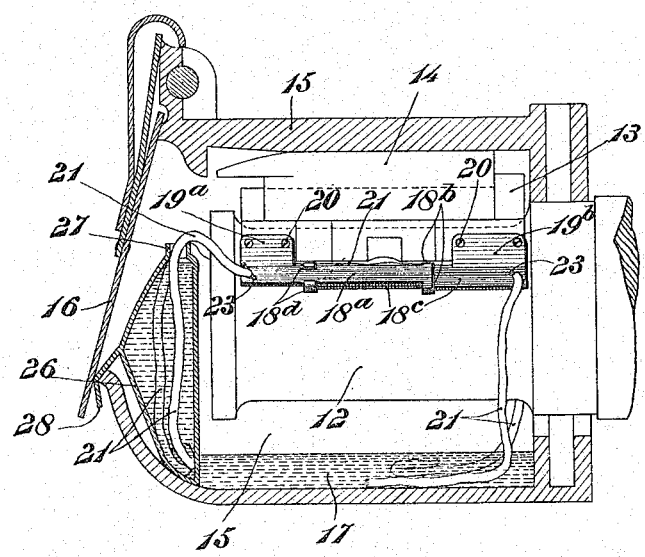

GEORGE P. SIMMONS AND BERTHA M. SIMMONS, OF UTICA, NEW YORK.

LUBRICATOR.

1,122,036.

Specification of Letters Patent.

Patented Dec. 22, 1914.

Application filed January 31, 1912. Serial No. 674,456.

*To all whom it may concern:*

Be it known that we, GEORGE P. SIMMONS and BERTHA M. SIMMONS, citizens of the United States, residing at Utica, in the county of Oneida and State of New York, have invented or discovered certain new and useful Improvements in Lubricators, of which the following is a specification, reference being had therein to the accompanying drawings.

This invention relates to devices for supplying lubricant to the bearing surfaces of relatively moving machine and other parts and has for its general object to provide means for efficiently and economically lubricating the entire area of such bearing surfaces.

A more particular object of the invention is to provide means whereby the lubricant may be used repeatedly without, however, causing such impurities as may find their way into the re-used lubricant from being returned to the bearing surfaces, provision being at the same time made for automatically supplying such amounts of fresh lubricant as may be necessary in order to compensate for loss or deterioration.

A second object of the invention is to provide improved means for reliably securing the lubricant applying devices in place which will not be subject to wear or breakage under rough handling or hard or severe conditions of use, but which may be depended upon to perform their intended function at all times and in a reliable manner.

Another object of the invention is to provide an improved construction and arrangement of the receptacle for the lubricant and more particularly to provide a receptacle which may be easily detached to permit convenient access to the bearing or for other purposes, but which, when in use, will be securely held in its proper position.

A still further object of the invention is to provide a lubricating device of simple and inexpensive construction which is not undesirably bulky or heavy, which may be readily applied to any bearing, and which will not in any way weaken the construction of such bearing or otherwise require material alteration thereof.

These and other objects of the invention, together with means whereby the same may be carried into effect, will best be understood from the following description of one form thereof as embodied in a car axle journal and journal box. It will be understood, however, that the application and construction described and shown have been chosen for illustrative purposes merely, that the invention may be applied to other bearings and bearing surfaces of widely varying types, and that the various features thereof may be embodied in other forms without departing from the spirit and scope thereof.

In said drawings: Figure 1 is a longitudinal section of a car axle journal box having our invention applied thereto. Fig. 2 is a transverse section on the line 2—2, Fig. 1. Fig. 3 is a detail perspective view of one of the wick holding brackets with a wick or feeder in place therein. Fig. 4 is a detail view on an enlarged scale of a portion of one of the wicks or feeders, showing the preferred construction thereof. Fig. 5 is a detail perspective view of the detachable lubricant receptacle. Fig. 6 is a view of another form of bracket and without the wick. Fig. 7 is a view similar to Fig. 1, but showing the form of bracket illustrated in Fig. 6.

12 denotes the axle journal, 13 the brass or bearing block engaging said journal, and 14 the saddle from which the journal box 15 is supported. The journal box 15, as herein shown, is of usual construction being provided in its end with an opening normally closed by a suitable door or cover 16, and having in its lower part an open space or well 17 in which the lubricant discharged from the journal 12 is received.

Secured to the sides of the bearing block 13 adjacent the opposite edges of the bearing surface thereof are brackets 18 whose preferred construction is shown most clearly in Fig. 3. As shown said brackets comprise strips of metal extending longitudinally of the bearing block 13 throughout substantially the entire length thereof and provided with angularly disposed ears 19 having perforations whereby said brackets may readily be secured to any bearing by means of screws 20. The brackets 18, when in place, form, in connection with the bearing block 13, grooves or channels extending longitudinally of the journal 12, or transverse to the direction of relative movement of the journal and bearing block, and in which grooves or channels are seated the lubricant feeders or wicks 21 having their longitudinal side faces in direct contact with the bearing surface of the journal 12 substantially throughout its entire length and at both sides of said journal.

For holding the wicks 21 securely seated in or on the brackets 18 said brackets are provided adjacent their opposite ends with perforations 22 through which said wicks are threaded so as to permit the portion thereof intermediate said perforations to be held in contact with the bearing surface, as above described, leaving the opposite ends of each of said wicks depending from said brackets, as hereinafter more fully explained. Any suitable means, such as pins 23 (see Fig. 1), may be employed for holding the wicks or feeders in fixed position in the brackets, said pins being inserted through said wicks at points adjacent the perforations 22.

Various of the advantages of our invention may be attained through the use of any suitable wicks or feeders 21, though the specially constructed wick illustrated in Fig. 4, and illustrated merely for the purpose of showing our invention in its most complete form, is found to give the most satisfactory results. It comprises strands 24 of yarn, cord, or other fibrous or textile material, suitably intertwined as by braiding, twisting, or the like, with fine flexible metallic wires 25. This wicking, however, constitutes the subject-matter of a divisional application, Serial No. 828,261, filed in our names on the 30th day of March, 1914, and hence need not be further described herein. It is reserved for and claimed in such divisional application. Wicking of the construction described, or in fact any good form of wicking, serves principally to supply lubricant to the bearing for long periods of time without attention, and these periods may, if desired, be lengthened by securing two or more wicks in place in each of the brackets, one in rear of the other, so that as one becomes entirely worn away, the other will be in position to act.

One end of each of the wicks or feeders 21 is allowed to depend into the space or well 17 at the base of the journal box 15, thereby keeping said wicks saturated with the lubricant contained in said space, so that said lubricant is repeatedly returned to the bearing without, however, carrying with it any impurities which may collect in said well or space 17. In order to provide for the supply of such fresh lubricant as may be necessary to compensate for loss or deterioration, the opposite end of each of the wicks or feeders 21 is extended into a separate lubricant receptacle 26 containing fresh lubricant. Said lubricant receptacle is preferably detachably arranged within the journal box between the end thereof and the end of the journal and may conveniently be of substantially the form shown in Fig. 5, the same being provided with an opening 27 for the introduction of the wicks or feeders and with a lip 28 adapted to engage over the lower edge of the opening in the end of the journal box in a position to be engaged by the cover 16. As will be seen, by opening said cover the receptacle 26 may readily be removed, said cover when closed, however, by engagement with the lip 28, effectively retaining said receptacle in its proper position.

In Fig. 6 is shown a modified form of wick holding bracket designed to be extensible in length in order to be applicable to journal box brasses of different sizes or to other bearing surfaces of variable extent. As shown, said bracket comprises two flat strips of metal 18$^a$ and 18$^c$ provided respectively with attaching ears 19$^a$ and 19$^b$. The strip 18$^a$ is provided with a pair of inturned lips 18$^b$ embracing the strip 18$^c$ which, in turn, is provided with a pair of similar lips 18$^d$ embracing the strip 18$^a$. The lips 18$^b$ and 18$^d$, while serving to prevent separation of the strips, embrace the same with sufficient looseness to permit a limited and guided relative longitudinal movement thereof, whereby said bracket may be extended or telescoped to the desired length. This construction is particularly useful in connection with car axle journals, it being customary, on many railroads, to employ brasses of several standard sizes.

By the use of the extension bracket above described it will be necessary to keep in stock only one standard lubricator equipment which may be easily and quickly applied to any journal box in use.

Having thus described our invention we claim and desire to secure by Letters Patent:

1. The combination with a journal and a journal box having an open space in its lower part to contain lubricant, of a separate lubricant receptacle distinct from said open space of the journal box, a bearing block resting upon said journal, brackets secured to each side of said bearing block and forming therewith grooves or channels extending longitudinally of said journal, wicks or feeders seated in said grooves or channels and having their longitudinal surfaces in contact with the sides of the journal, the opposite free ends of each of said wicks or feeders being extended respectively into said open space and into said separate lubricant receptacle.

2. The combination with a journal and a journal box having an opening in its end and a cover for said opening, of a bearing block, a wick or feeder secured to said bearing block, and a lubricant receptacle removably located within said journal box between said cover and the end of the journal and provided with a lip engaging the lower edge of said opening and engaged by said cover, to retain said receptacle in place, said wick extending into said receptacle and having its longitudinal face in immediate contact with said journal.

3. In a lubricating device, the combination of a journal and a journal box having a main lubricant receptacle, a bearing block having a bearing face engaging said journal, brackets secured to the sides of said block at the edges of said bearing face, wicks or feeders composed of entwined metallic wires and strands of fibrous material seated in said brackets and having free ends extending therefrom, and a separate lubricant receptacle carried by the journal box, the opposite ends of each of said wicks or feeders being carried respectively into said main lubricant receptacle and into said separate lubricant receptacle, whereby a supply of fresh or unused lubricant is constantly delivered to the surface to be lubricated, and a portion of the used lubricant is likewise delivered to said surface for re-use.

4. The combination with two relatively movable parts having bearing surfaces, of a longitudinally extensible bracket secured to one of said parts at the edge of its bearing surface, and a wick or feeder seated in said bracket and having its side face in direct contact with the bearing surface of the other of said parts.

5. In a lubricating device, a wick holding bracket comprising two flat strips having each an attaching ear and a pair of inturned lips, the lips on each of said strips loosely embracing the other of said strips and permitting a limited relative longitudinal movement thereof, whereby said bracket may be extended.

In testimony whereof we affix our signatures, in presence of two witnesses.

GEORGE P. SIMMONS.
BERTHA M. SIMMONS.

Witnesses:
THEO E. MOSER,
H. R. HEMMENS.

Copies of this patent may be obtained for five cents each, by addressing the " Commissioner of Patents, Washington, D. C."